(12) United States Patent
Lindell

(10) Patent No.: US 7,873,495 B2
(45) Date of Patent: Jan. 18, 2011

(54) WELDING QUALITY CONTROL AND MONITORING SYSTEM

(75) Inventor: Nate S. Lindell, Portland, OR (US)

(73) Assignee: Inspectech Corporation, Las Vegas, NV (US)

(*) Notice: Subject to any disclaimer, the term of this patent is extended or adjusted under 35 U.S.C. 154(b) by 135 days.

(21) Appl. No.: 12/380,085

(22) Filed: Feb. 24, 2009

(65) Prior Publication Data
US 2010/0217440 A1   Aug. 26, 2010

(51) Int. Cl.
*G05B 13/00* (2006.01)
(52) U.S. Cl. .................... 702/182; 702/179; 702/81; 219/121.61; 219/121.83; 219/121.62; 219/130.01; 219/137 PS
(58) Field of Classification Search ................ 702/179, 702/182, 81–84, 108–111; 219/121.61, 121.83, 219/121.63, 121.62, 121.64, 121.85, 130.01, 219/130.21, 98, 99, 137 PS; 700/166, 275, 700/32–34, 108, 109, 110, 111, 51; 340/3.1, 340/3.3, 3.42, 3.43, 3.44; 706/900, 904
See application file for complete search history.

(56) References Cited

U.S. PATENT DOCUMENTS

| 5,272,312 | A | * | 12/1993 | Jurca |  |
|---|---|---|---|---|---|
| 5,659,479 | A | * | 8/1997 | Duley et al. |  |
| 5,708,253 | A | * | 1/1998 | Bloch et al. |  |
| 6,244,015 | B1 | * | 6/2001 | Ito et al. |  |
| 6,311,099 | B1 | * | 10/2001 | Jasper et al. | ................ 700/166 |
| 6,335,504 | B1 | * | 1/2002 | Ling et al. | ................... 219/109 |
| 6,400,997 | B1 | * | 6/2002 | Rapp, III | ..................... 700/83 |
| 6,583,386 | B1 |  | 6/2003 | Ivkovich | ................. 219/130.01 |
| 6,707,003 | B2 | * | 3/2004 | Rouault | ................... 219/137 R |
| 6,909,066 | B2 | * | 6/2005 | Zheng et al. | ............. 219/130.5 |
| 7,079,906 | B2 | * | 7/2006 | Rapp, III | ..................... 700/96 |
| 7,102,098 | B2 | * | 9/2006 | Rouault et al. | ............ 219/130.5 |
| 7,107,118 | B2 | * | 9/2006 | Orozco et al. | ................ 700/166 |
| 7,289,862 | B2 | * | 10/2007 | Britton | ........................ 700/110 |
| 7,574,172 | B2 | * | 8/2009 | Clark et al. | .................... 455/39 |
| 7,689,298 | B2 | * | 3/2010 | Britton | ........................ 700/51 |
| 7,728,254 | B2 | * | 6/2010 | D'Angelo et al. | ...... 219/121.62 |
| 7,781,700 | B2 | * | 8/2010 | Harris | ..................... 219/130.5 |
| 2002/0144984 | A1 | * | 10/2002 | Mori et al. | ............. 219/121.64 |
| 2004/0117233 | A1 | * | 6/2004 | Rapp, III | ........................ 705/9 |
| 2004/0133298 | A1 | * | 7/2004 | Toyserkani et al. |  |
| 2004/0249495 | A1 | * | 12/2004 | Orozco et al. |  |

(Continued)

*Primary Examiner*—Carol S Tsai
(74) *Attorney, Agent, or Firm*—Harrington & Smith (57) ABSTRACT

A quality assurance system includes an internet/wide area network interface configured to provide bidirectional communication with user terminals; a wireless interface configured to provide bidirectional communication with mobile user terminals; and a quality assurance database cooperatively coupled with a database manager. The data base manager is configured to populate the quality assurance database with identifications of individual ones of a plurality of construction project welders, weld inspectors and a plurality of weld data logs individual ones of which are associated with a specific welding operation of a construction project. Each weld data log is configured to store information that is at least descriptive of a welder, material used during the specific welding operation, specifics of a completed weld including at least weld location, weld type and weld dimensions, and information descriptive of a weld examination. Information entry into at least one weld data log is made by a weld inspector using a report from one of the mobile user terminals.

25 Claims, 10 Drawing Sheets

U.S. PATENT DOCUMENTS

| | | |
|---|---|---|
| 2006/0096753 A1* | 5/2006 | Zheng et al. |
| 2007/0080153 A1* | 4/2007 | Albrecht et al. |
| 2007/0198105 A1* | 8/2007 | Britton |
| 2008/0104117 A1* | 5/2008 | Stevens et al. |
| 2008/0149687 A1* | 6/2008 | Garnett et al. |
| 2008/0234960 A1* | 9/2008 | Byington et al. |
| 2009/0200282 A1* | 8/2009 | Hampton |

* cited by examiner

Material Data Log
Return to previous page

Order Details — Show/Hide

| | | | |
|---|---|---|---|
| PO #: | ORDER001 | Ordered: | 10/1/2007 |
| Ordered: | 1 | Received: | 1 |
| Material: | Plate | Grade: | 250 |
| Standard: | A709 | Line #: | 1 |
| Length: | 1000 | Thickness: | 10 |
| Manufacturer: | Wuyang | Temperature Zone: | T1 |
| Supplement: | Z25 S1 S2 | Supplements to add: S3 | |

Receiving — Show/Hide

| | | | |
|---|---|---|---|
| Received: | 10/2/2007 | Plate Id: | PLATE001 |
| Barcode: | PLATE001 | Reassign Barcode | Barcode Cutout |
| Lot #: | LOT001 | Cert #: | CERT001 |
| Heat #: | HEAT001 | Batch #: | |
| Weight: | | Width: | 100 |
| Place: | | Contract #: | |
| Approved Batch: | 34 | CT Lot #: | |
| Receiving Status: | CT Accept | ZPMC Designation: | Choose ZPMC– |
| Inspector: | Nate Lindell | | |

Receiving Inspection — Show/Hide

- MTR supplied?
- Weld repairs visible?
- FCM material?
- Markings in accordance with ASTM A6
- Visually acceptable in accordance with ASTM A6

Material Receiving Filter List
Return to previous page

Show/Hide Search Panel

| | | | | |
|---|---|---|---|---|
| ☑ | PO #: | -Choose PO #- ▽ | ☐ | PO Date: |
| ☐ | Line #: | | ☐ | Received Date: |
| ☐ | Supplement | | ☐ | Barcode: |
| ☐ | Plate ID: | | ☐ | Lot #: |
| ☐ | Batch#: | | ☐ | Heat#: |
| ☐ | Cert#: | | ☐ | Length: |
| ☐ | Width: | | ☐ | Thickness: |
| ☐ | Weight: | | ☐ | Place: |
| ☐ | Contact #: | | ☐ | Approved Batch: |
| ☐ | CT Lot #: | | ☐ | Receiving Inspector: -Choose Inspector- ▽ |
| ☐ | Manufacturer: -Choose Manufacturer- ▽ | | ☐ | Material: -Choose Material- ▽ |
| ☐ | Standard: -Choose Standard- ▽ | | ☐ | Grade: -Choose Grade- ▽ |
| ☐ | ZPMC Designation: -Choose ZPMC- ▽ | | ☐ | Status: -Choose Status- ▽ |
| ☐ | Temperature Zone: -Choose Temp Zone- ▽ | | ☐ | MTR Supplied: |
| ☐ | Check Sampled | | ☐ | Check Sample Date: |
| ☐ | Check Sample Status: -Choose Status- ▽ | | ☐ | Check Sample Inspector: -Choose Inspector- ▽ |

Search

FIG.3

Weld Data Log

Weld Data Log

Originator: Mead, Josh
Status:
Subassembly: SUB ASSEMBLY1
Assembly: DP
Segment: 2BE
Lift: 1E
Repair Length:
Repair Depth:

Report #: WLD002
Parent Report #:
Job:
Origination Date: 10/13/2007
Completion Date:
Weld ID: WELD_ID_2
Weld Map #: WELD_MAP_NUMBER_2
Drawing #: DRAWING_NUMBER_2
Barcode: WELD001
Repair Width:

[Save]

Weld Type

Weld Type: Complete Joint Penetration
Code: AWS D1.5-02

FIG. 4

Base Metals

| Barcode | Plate Number | Standard | Grade | Heat Number | Thickness | |
|---|---|---|---|---|---|---|
| PLATE001 | PLATE001 | A709 | 250 | HEAT001 | 10 | Remove |
| PLATE002 | PLATE002 | A709 | 250 | HEAT002 | 10 | Remove |

Add Base Metal

Tasks

| # | Hold | Task Type | Report | Completor | Status | Date | |
|---|---|---|---|---|---|---|---|
| 1 | ☐ | Install Barcode or Weld ID | Accept | | | | Edit Delete |
| 2 | ☐ | Weld joint fit up inspection | Accept | | | | Edit Delete |
| 3 | ☐ | Assembly Practice | Log Progress | | | | Edit Delete |
| 4 | ☐ | Welding Techniques | Log Progress | | | | Edit Delete |
| 5 | ☐ | Welding Parameters | Log Progress | | | | Edit Delete |
| 6 | ☐ | Perform 100% Visual Inspection | Create Report | | | | Edit Delete |
| 7 | ☐ | Perform 100% Ultrasonic Inspection AWDS D1.5-02 Table 6.3 for acceptance | Create Report | | | | Edit Delete |
| 8 | ☐ | Perform 25% Magnetic Particle Inspection | Create Report | | | | Edit Delete |

Add Task

Repair History

No Repairs have been made

Base Metals

| Barcode | Plate Number | Standard | Grade | Heat Number | Thickness | |
|---|---|---|---|---|---|---|
| PLATE001 | PLATE001 | A709 | 250 | HEAT001 | 10 | Remove |
| PLATE002 | PLATE002 | A709 | 250 | HEAT002 | 10 | Remove |

[Add Base Metal]

Tasks

| # | Hold | Task Type | Report | Completor | Status | Date | |
|---|---|---|---|---|---|---|---|
| 1 | ☐ | Install Barcode or Weld ID | Accept | | | | |
| 2 | ☐ | Weld joint fit up inspection | Accept | | | | |
| 3 | ☐ | Perform 100% Visual Inspection | VT0000007 | Site Admin | Acccepted | 02/05/2008 | Edit Delete |
| 4 | ☐ | Perform 100% Ultrasonic Inspection AWDS D1.5-02 Table 6.4 for acceptance | UT0000009 | Site Admin | Repair in Progress | 02/05/2008 | Edit Delete |
| 5 | ☐ | Perform 10% Magnetic Particle Inspection | MT0000011 | Site Admin | Repair in Progress | 02/05/2008 | Edit Delete |

[Add Task]

Repair History

| # | Task Type | Report | Completor | Status | Date |
|---|---|---|---|---|---|
| 4 | Perform 100% Ultrasonic Inspection AWDS D1.5-02 Table 6.4 for acceptance | UT0000009 | Site Admin | Repair in Progress | 02/05/2008 |
| | Critical Weld Repair | CWR0000010 R0 | Site Admin | Repair in Progress | 02/05/2008 |
| 5 | Perform 10% Magnetic Particle Inspection | MT0000011 | Site Admin | Repair in Progress | 02/05/2008 |
| | Weld Repair | WRR0000012 R0 | Site Admin | Repair Failed | 02/05/2008 |

FIG. 7

Weld Report

Structure: OBG
By Date: 11/12/2007 ☐ View
By Week: 11/12/2007-11/19/2007 (Week#2) ▾

11/12/2007-11/18/2007

Viewing: 11/16/2007-Friday

Weld Reject Log                                                                                                                  Show/Hide

| Date | Inspector | Welder | Repair | Task | Lift | Segment | Assembly | Sub Assembly | Weld ID | % | Cause | Inspection Method |
|---|---|---|---|---|---|---|---|---|---|---|---|---|
| 11/16/2007 | Li Liming | | WRR0000009 R0 | Ultrasonic Examination 100% AWS D1.5-02 Table 6.3 | | | FB | FB003 | FB003-13-001 | | | UT |
| 11/16/2007 | Li Liming | | WRR0000010 R0 | Ultrasonic Examination 100% AWS D1.5-02 Table 6.3 | | | FB | FB003 | FB003-14-006 | | | UT |
| 11/16/2007 | Li Liming | | WRR0000011 R0 | Ultrasonic Examination 100% AWS | | | FB | FB003 | FB003-15-001 | | First time excavation | UT |
| 11/16/2007 | Li Liming | | WRR0000012 R0 | | | | FB | FB3A | FB003-05-001 | | First time excavation | UT |
| 11/16/2007 | Li Liming | | WRR0000013 R0 | | | | FB | FB3A | FB003-16-001 | 9.52 | First time excavation | UT |
| 11/16/2007 | Li Liming | | WRR0000014 R0 | | | | FB | | FB003-16-006 | 2.86 | First time excavation | UT |

Daily Production Log                                                                                                             Show/Hide

| Weld ID | Inspector | Location | Logged | % | SubAssembly | Assembly | Segment | Lift | Structure | Repair |
|---|---|---|---|---|---|---|---|---|---|---|
| FB003-10-001 | Li Liming | | 11/16/2007 | | FB003 | FB | | | OBG | |
| FB003-10-006 | Li Liming | | 11/16/2007 | | FB003 | FB | | | OBG | |
| FB003-08-001 | Li Liming | | 11/16/2007 | | FB003 | FB | | | OBG | |

FIG. 8

Weld Reject Log

Show/Hide Search

| ☑ Original Weld | | | ☑ Repair Weld | |
|---|---|---|---|---|
| ☑ Date Range: | | to | ☑ Inspection Method: | |
| ☑ Inspector | | | ☑ Repair | |
| ☐ SubAssembly | | | ☐ Assembly | |
| ☐ Segment | | | ☐ Lift | |
| ☐ Structure | | | ☐ Weld ID | |
| ☐ Repair Length | | | ☑ Repair % | |
| ☑ Cause | | | ☑ Welder | |
| ☑ Indication Repair | | | ☑ Process | |
| ☑ Joint Type | | | ☐ WPS # | |
| ☐ Filler Metal: | | | | |

[Search]

All, None

| Date | Inspection Method | Inspector | Repair | Repair Length | Repair % | Cause | Welder | Position | Process | Joint Type |
|---|---|---|---|---|---|---|---|---|---|---|
| 11/16/2007 | UT | Li Liming | WRR0000010 R0 | 210 | | | 50242 | 1G | FCAW | Butt |
| 11/16/2007 | UT | Li Liming | WRR0000013 R0 | 160 | 9.52 | First time excavation | 50242 | 1G | FCAW | Butt |
| 11/16/2007 | UT | Li Liming | WRR0000014 R0 | 60 | 2.86 | First time excavation | 50242 | 1G | FCAW | Butt |
| 11/16/2007 | UT | Li Liming | WRR0000012 R0 | 150 | | | 50242 | 1G | FCAW | Butt |
| 11/16/2007 | UT | Li Liming | WRR0000009 R0 | 580 | | First time excavation | 50242 | 1G | FCAW | Butt |
| 11/16/2007 | UT | Li Liming | WRR0000011 R0 | 500 | | First time excavation | 50242 | 1G | FCAW | Butt |
| 03/21/2008 | UT | Xue Hairong | T-WR001 R0 | 130 | .69 | First time excavation | 48659 | 1G | SMAW | Butt |
| 04/05/2008 | UT | Xue Hairong | WRR0000003 R0 | 130 | 1.06 | First time excavation | 40421 | 1G | FCAW | Butt |
| 04/05/2008 | UT | Xue Hairong | WRR0000005 R0 | 160 | 1.11 | First time excavation | 53870 | 1G | FCAW | Butt |
| 04/06/2008 | UT | Xue Hairong | WRR0000007 R0 | 160 | 1.28 | First time excavation | 53753 | 1G | SMAW | Butt |

FIG. 9

Sub Assembly: BP2A
Weld ID Start:
Show Summary: ☑
Show Detail: ☐
Show Completed Tasks: ☐
Show All Tasks: ☐
Search Total Welds: 36 Accepted (WDL) Welds: 0 Accepted (tasks) Welds: 0
Total Weld Length (mm): 183,449
Total Repair Length (mm): 0.00 Repair %: 0.00%

| WDL | Weld ID | Type | WDL Status | Tasks Status | #Tasks | #Accepted | #Failed | #Other | Mass Change |
|---|---|---|---|---|---|---|---|---|---|
| WDL0000474 | BP002-001-001 | CJP | In Progress | | 13 | 3 | 0 | 10 | ☐ |
| WDL0000897 | BP002-001-002 | CJP | In Progress | | 7 | 2 | 0 | 5 | ☐ |
| WDL0000899 | BP002-001-003 | CJP | In Progress | | 7 | 2 | 0 | 5 | ☐ |
| WDL0000901 | BP002-001-004 | CJP | In Progress | | 7 | 2 | 0 | 5 | ☐ |
| WDL0000903 | BP002-001-005 | CJP | In Progress | | 7 | 2 | 0 | 5 | ☐ |
| WDL0000905 | BP002-001-006 | CJP | In Progress | | 7 | 2 | 0 | 5 | ☐ |
| WDL0000907 | BP002-001-007 | CJP | In Progress | | 7 | 2 | 0 | 5 | ☐ |
| WDL0000945 | BP002-001-008 | Fillet | In Progress | | 9 | 1 | 0 | 8 | ☐ |
| WDL0000946 | BP002-001-009 | Fillet | In Progress | | 9 | 1 | 0 | 8 | ☐ |
| WDL0000947 | BP002-001-010 | Fillet | In Progress | | 9 | 1 | 0 | 8 | ☐ |
| WDL0000948 | BP002-001-011 | Fillet | In Progress | | 9 | 1 | 0 | 8 | ☐ |
| WDL0000949 | BP002-001-012 | Fillet | In Progress | | 9 | 1 | 0 | 8 | ☐ |
| WDL0000950 | BP002-001-013 | Fillet | In Progress | | 9 | 1 | 0 | 8 | ☐ |
| WDL0000951 | BP002-001-014 | Fillet | In Progress | | 9 | 1 | 0 | 8 | ☐ |
| WDL0000952 | BP002-001-015 | Fillet | In Progress | | 9 | 1 | 0 | 8 | ☐ |

Weld Type: CJP          Plate Number: PL56487
Structure: OBG          Lift: 2E
Segment: 10AE           Assembly: BP
Sub Assembly: BP111     Weld Map: WM345
Weld Length(mm): 1255   Weld Width(mm): 25
Weld Depth(mm): 75

Joint prep/Fit up & Assembly Practice Delete
Start of Welding Delete
Weld Parameter & Weld Techniques Delete
Weld Complete Delete
Visual Examination 100% AWS D1.5-02 Section 6 Delete
Radiographic Examination 100% AWS D1.5-02 Figure6.8 Delete
Ultrasonic Examination 100% AWS D1.5-02 Table 6.3 Delete
Ultrasonic Examination 100/50% of weld length AWS D1.5-02 Table 6.3(note: see figure 1 sub 87) Delete
Ultrasonic Examination 100/50% of weld length AWS D1.5-02 Table 6.3(note: see figure 1 sub 87) Add Task

First Weld ID: BP-111-001    Number to Create: 5000
Skip duplicate Weld IDs during creation:
Mass Create
Weld ID:
Add Single

FIG. 10

WELDING QUALITY CONTROL AND MONITORING SYSTEM

TECHNICAL FIELD

The exemplary embodiments of this invention relate generally to quality control systems, methods and computer programs and, more specifically, to quality control system, methods and computer programs related to welding, inspections and nondestructive testing operations.

BACKGROUND

Welding may be defined as a process to join two materials, such as similar or dissimilar metals, by applying heat, possibly while applying pressure and possibly also using an intermediate or filler metal having a high melting point.

Inspections may be defined as an organized examination or formal evaluation exercise. It involves the measurements, tests, and gauges applied to certain characteristics in regard to an object or activity. The results are usually compared to specified requirements and standards for determining whether the item or activity is in line with these targets.

Non-Destructive Examination (NDE) may be defined as a number of technologies used to analyze materials for either inherent flaws or damage from use without damaging the part or component. Some commonly used NDE methods are visual, Liquid or Dye Penetrant, Magnetic Particle, Radiography, Ultrasonic, Eddy Current and Acoustic Emission.

In a large scale construction project, such as one involving the fabrication of a bridge or a building, there may be at least thousands or tens of thousands of individual welds. These welds may be made over a course of weeks, months or even years by many different welders using different welding equipment and materials. As may be appreciated, it can be a daunting task to attempt to maintain records of the individual welds and the quality of the individual welds.

SUMMARY

The foregoing and other problems are overcome, and other advantages are realized, in accordance with the exemplary embodiments of this invention.

In one aspect thereof the exemplary embodiments of this invention implement a method to provide quality assurance information for a construction project. The method comprises populating a quality assurance database with identifications of individual ones of a plurality of construction project welders and weld inspectors; and further populating the quality assurance data base with a plurality of weld data logs individual ones of which are associated with a specific welding operation of the construction project. Each weld data log is configured to store information that is at least descriptive of a welder, material used during the specific welding operation, specifics of a completed weld including at least weld location, weld type and weld dimensions, and information descriptive of a weld examination. Information entry into at least one weld data log is made by a weld inspector using a mobile terminal that is capable of wireless communication with the quality assurance database.

In another aspect thereof the exemplary embodiments of this invention implement a quality assurance system that comprises an internet/wide area network interface configured to provide bidirectional communication with user terminals; a wireless interface configured to provide bidirectional communication with mobile user terminals; and a quality assurance database cooperatively coupled with a database manager. The data base manager is configured to populate the quality assurance database with identifications of individual ones of a plurality of construction project welders, weld inspectors and a plurality of weld data logs individual ones of which are associated with a specific welding operation of a construction project. Each weld data log is configured to store information that is at least descriptive of a welder, material used during the specific welding operation, specifics of a completed weld including at least weld location, weld type and weld dimensions, and information descriptive of a weld examination. Information entry into at least one weld data log is made by a weld inspector using a report from one of the mobile user terminals.

In a further aspect thereof the exemplary embodiments of this invention provide a computer-readable memory that stores a program of computer-executable instructions, where execution of the instructions results in operations that comprise populating a quality assurance database with identifications of individual ones of a plurality of construction project welders and weld inspectors; further populating the quality assurance data base with a plurality of weld data logs individual ones of which are associated with a specific welding operation of the construction project, each weld data log being configured to store information that is at least descriptive of a welder, material used during the specific welding operation, specifics of a completed weld including at least a unique weld identifier, weld location, weld type and weld dimensions, and information descriptive of a weld examination; and periodically generating at least one type of report based at least on the plurality of weld data logs. Information entry into at least one weld data log is made by a weld inspector using a mobile terminal that is capable of wireless communication with the quality assurance database.

BRIEF DESCRIPTION OF THE DRAWINGS

The foregoing and other aspects of the embodiments of this invention are made more evident in the following Detailed Description, when read in conjunction with the attached Drawing Figures, wherein.

DETAILED DESCRIPTION

Figure 1:
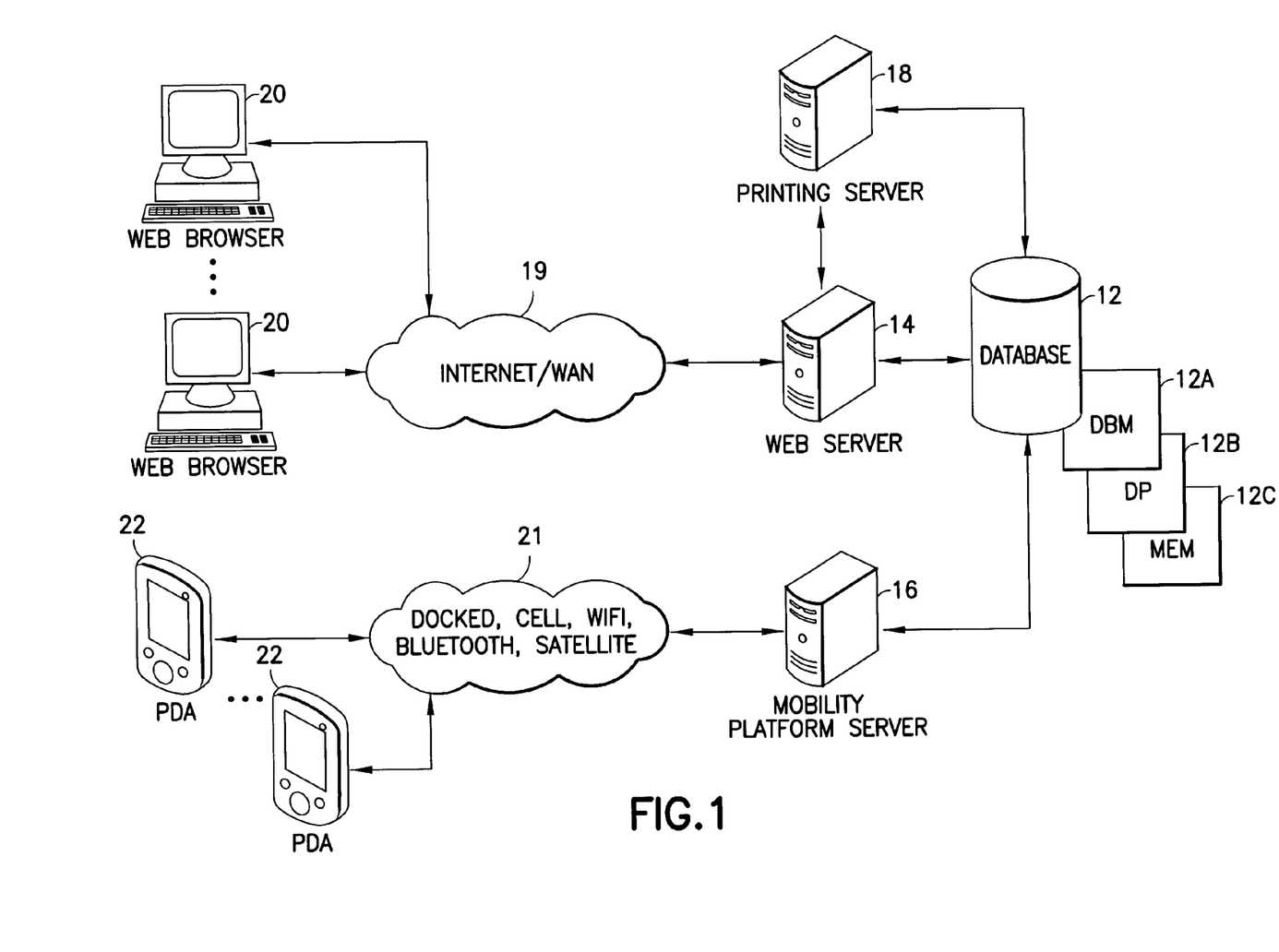
FIG. 1 is a system level block diagram of a weld quality assurance system in accordance with an exemplary embodiment of this invention.

Reference is made to FIG. 1 for showing an exemplary embodiment of a weld quality assurance system 10. The weld quality assurance system 10 includes a database 12 that is assumed to include a database manager (DBM) 12A. A user interface with the database 12/DBM 12A may be implemented via a web server 14 and a mobility platform server 16. The web server 14 may be associated with a separate printing server 18. The web server 14 provides access to user terminals (e.g., fixed location or portable computers/work stations) 20 via an internet/WAN (wide area network) link 19. The user terminals 20 may include web browsers through which a user is enabled to query and otherwise interact with the web enabled database 12/DBM 12A, such as to specify and print logs and certain reports via the printing server 18. The mobility platform server 16 provides access to mobile terminals 22, such as terminals embodied as PDAs, via any suitable type of wired/wireless interfaces 21, including but not limited to docked interfaces, cellular interfaces, WiFi interfaces, Bluetooth™ interfaces and satellite-based interfaces. The mobility platform server 16 may be based on PointSync™ server technology. During use the mobile terminals 22 are typically located at a particular construction project site and/or a work area (e.g., factory floor), and terminal operators, such as inspectors and/or project management persons, can use a graphical user interface (GUI) of the mobile terminals 22 to send weld-related data back to the database 12/DBM 12A for populating database records, as described in further detail below. The GUI of the mobile terminals 22 may also be used to receive information from the database 12/DBM 12A. The mobile terminals 20 may typically also include other functionality, such as bar code scanning functionality and digital image capture functionality as two non-limiting examples. Bar code technology may be used to track welds and tasks completed to the welds. Otherwise, unique weld identification numbers may be assigned to designate individual welds. The bar code technology may also be used to track individual components as well. For example the tracking of small parts, bolt kegs, and other construction-related components.

The weld quality assurance system 10 may be considered to be a web-based quality tool. The tool may be based on, as non-limiting examples, Microsoft ASP.NET and the C# programming language. The weld quality assurance system 10 may be used by, for example, a fabricator, a contractor or an owner specifically to document the fabrication of a construction project.

The weld quality assurance system 10 replaces traditional reporting and weld tracking methods for the structural steel, welding, fabrication and construction industries, and provides the option of accessing the application via the computers 20 and/or the mobile hand held devices 22. The weld quality assurance system 10 provides for the real time reporting of inspections and repairs before, during and after welding by use of the hand held devices 22 and wireless network 21.

As considered herein a "report" is an information descriptive element that a user may fill out either from the mobile device 22 or from the computer terminal 20. An example is a non-destructive examination report. A signature may be required on all reports. Signatures may be captured once and auto populated based on a particular user's log in name and access rights. A "log" is an information descriptive element that is viewable, and typically un-editable, on the mobile device 22 or computer terminal 20. All reports and logs are preferably viewable from the web server 14/mobility platform server 16 at the fixed computer terminals 20 or mobile terminals 22.

Access to individual inspection reports is preferably based upon the certification of the user. The user is required to be certified (authorized) for the specific method of inspection or the user cannot by definition create the report. For example, the user should be recorded as being qualified to perform a radiographic examination before the user in enabled upload a completed radiographic non-destructive examination report.

There are various classifications of project users. An administrator has read/write access to the entire weld quality assurance system 10 application. A QA (Quality Assurance) user may also have read/write access to the entire application, and may be responsible for the pre-loading of the application. A QC (Quality Control) user is responsible for the creation of reports and the recording of tasks from either the computer terminal 20 or the mobile device 22. An "authorized third party" user, such as a regulatory agency inspector, preferably read only access to all reports and logs. The welders preferably do not directly interact with the mobile application via the mobile terminals 22. In general a production team and/or a fabrication team may access the application to obtain information for trend analysis and similar purposes (view only). The weld quality assurance system 10 is capable of creating an unlimited amount of user groups and user names, where the created user groups can be granted read, read/write or denied access to all portions of the application.

The weld quality assurance system 10 provides real time reporting of inspections and repairs before, during and after welding by use of the hand held devices embodied as the mobile terminals 22 and the wireless network 21, and provides material traceability through the use of bar code technology and a material data log. The weld quality assurance system 10 in one aspect thereof provides accountability of welders through tracking repair rates by welder, process, position, joint configuration and cause, and enables the determination that all required inspections and repairs are completed in advance of shipment/job completion. The weld quality assurance system 10 provides access via the World Wide Web to unlimited personnel to view the real time inspection and repair status, using the user terminals 20 and their respective web browsers.

Non-limiting examples of industries in which the weld quality assurance system 10 may be used to advantage include bridge, aerospace, nuclear, hydroelectric, marine, military and construction.

The weld quality assurance system 10 provides material traceability, weld joint tracking, welder performance tracking, periodic (e.g., weekly) welding reports and documentation.

Figure 2:
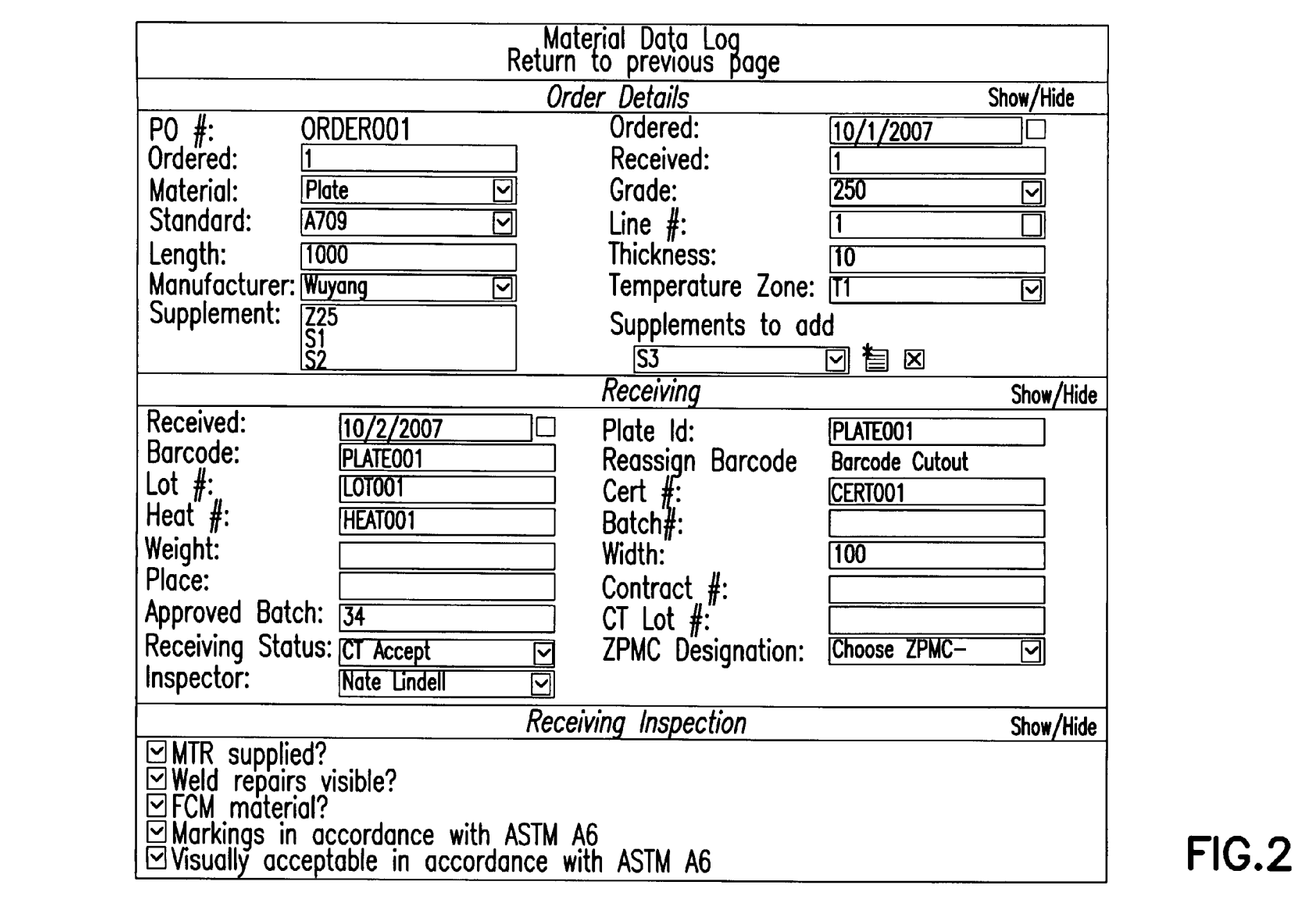
FIG. 2 shows an example of material data log which is one feature of the weld quality assurance system shown in FIG. 1.
Figure 3:
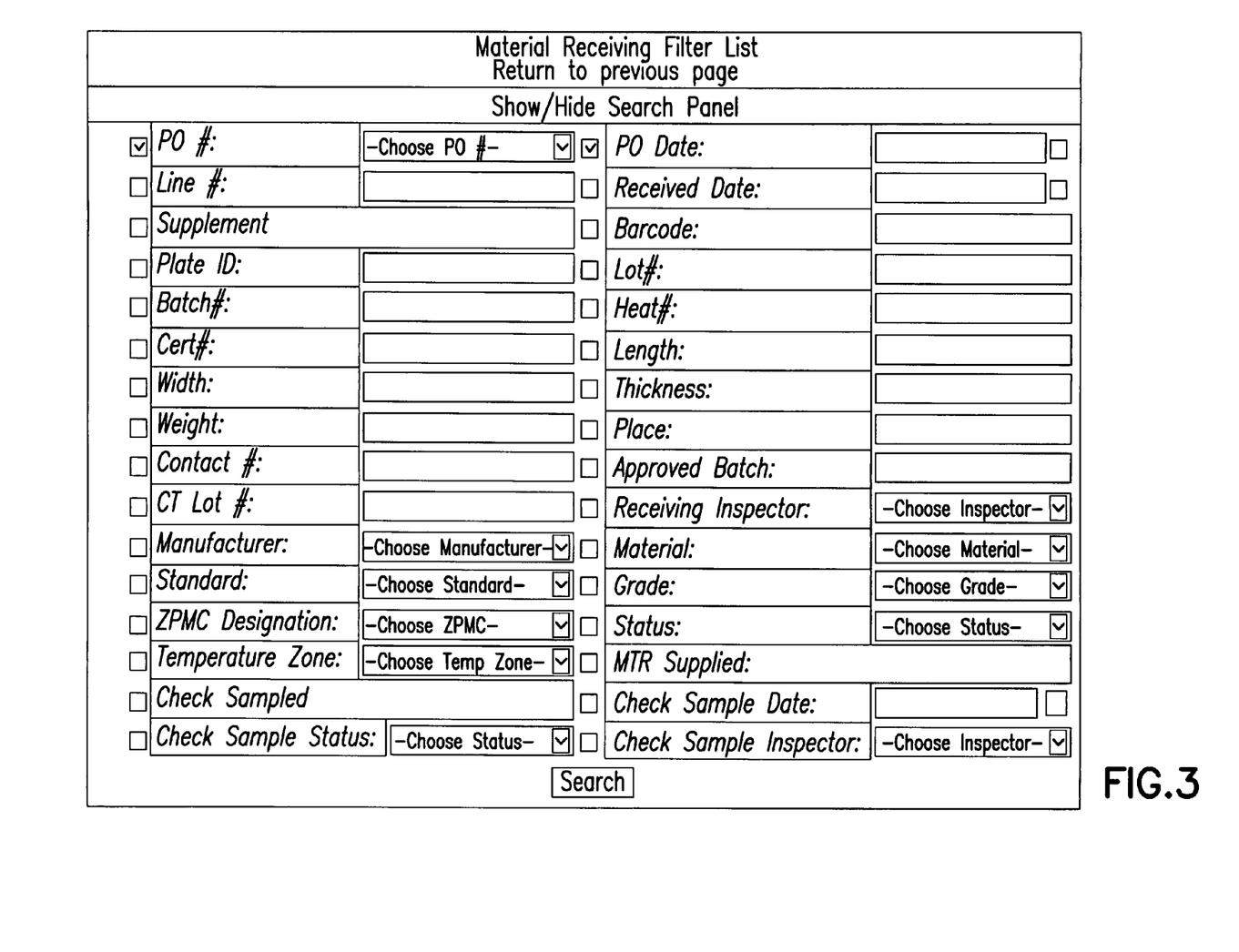
FIG. 3 shows an example of a material receiving filter list which is another feature of the weld quality assurance system shown in FIG. 1.

Material traceability is accomplished by use of bar code technology and/or more traditional means of tracking items such as heat number and grade. The material-related information is compiled and stored on a material data log (see FIG. 2) as well as on a weld data log (see FIG. 4). Database filtering allows the user to search by any desired combination of fields (see FIG. 3). Material lists may be downloaded offsite for material on hand payments, and provides a consolidated material list between parties. Also provided is an ability to ensure individual plate traceability and sample verification.

Figure 4:
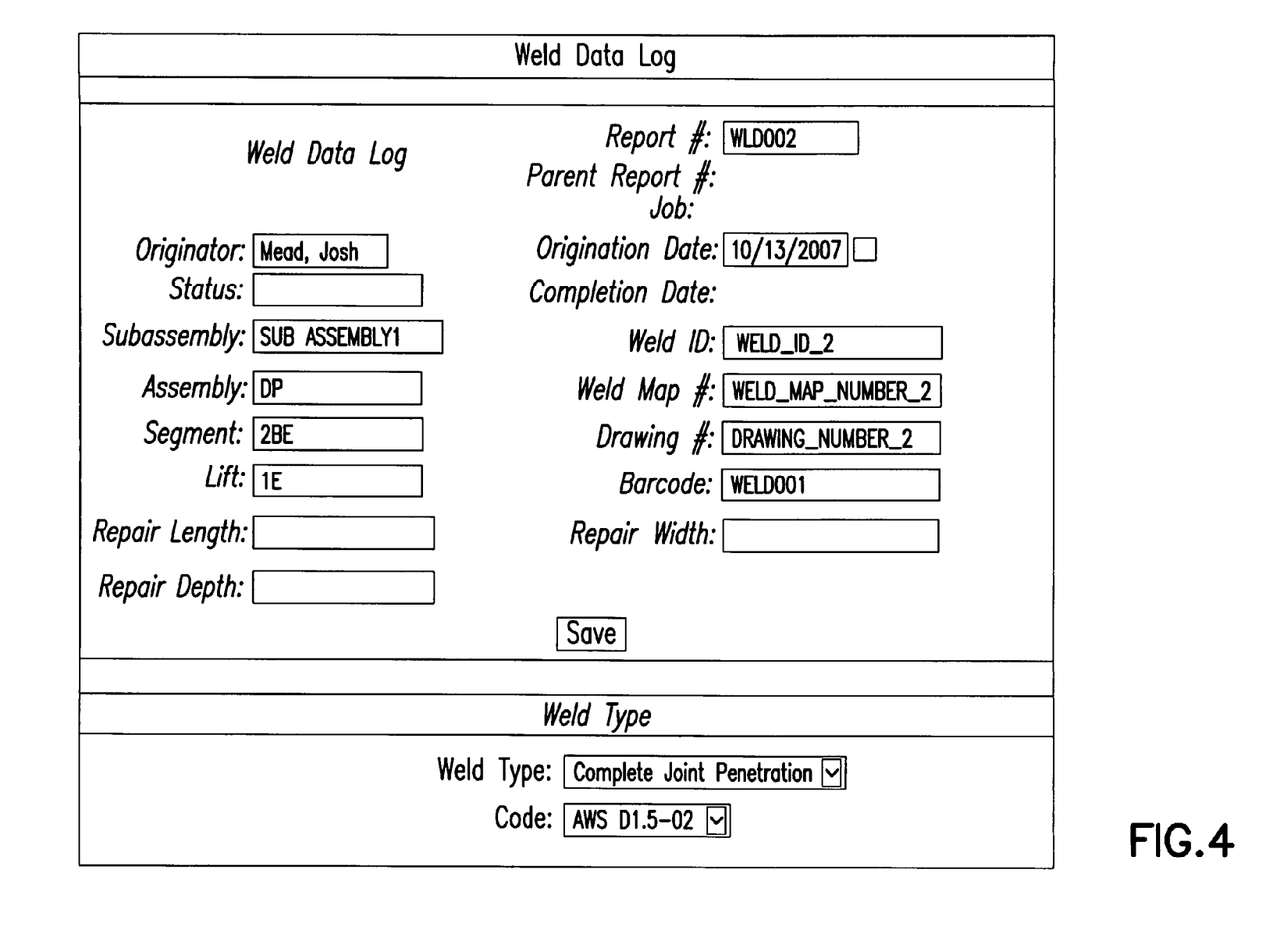
FIGS. 4, 5 and 6 show examples of a weld data log which is another feature of the weld quality assurance system shown in FIG. 1.
Figure 5:
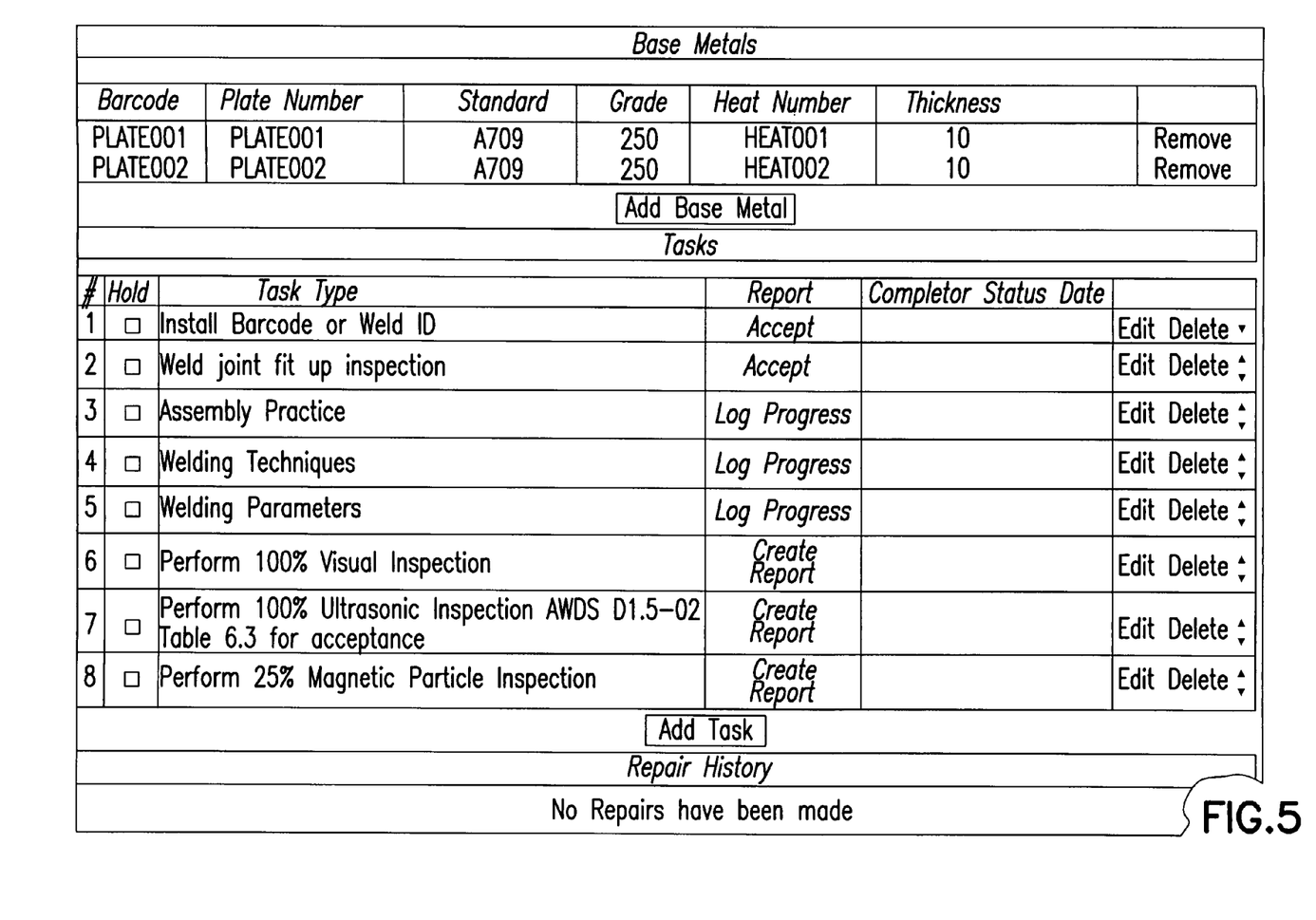
Figure 6:
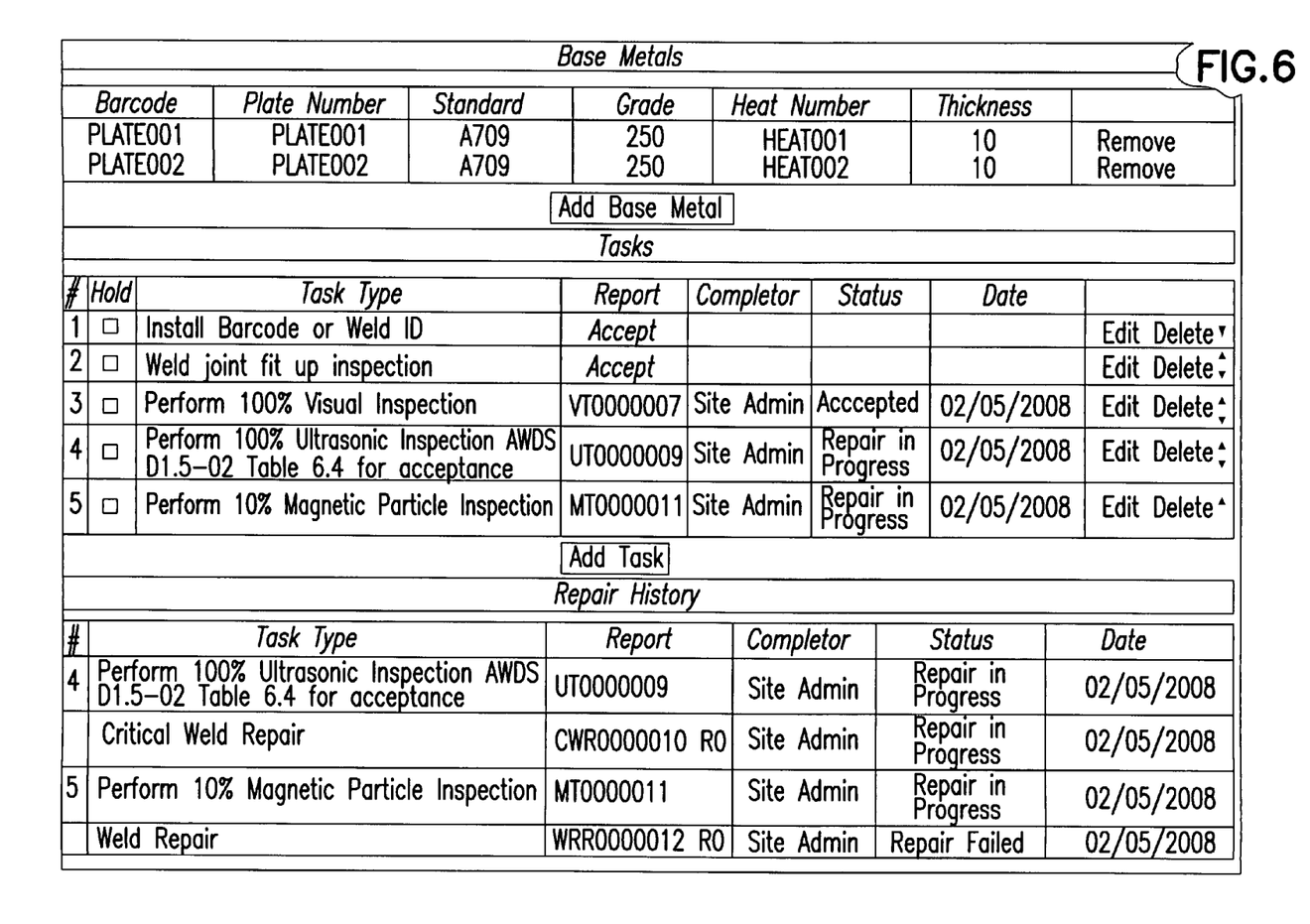

The weld data log shown in FIGS. 4, 5 and 6 provides a centralized location for each weld joint on a particular project. The weld data log is created prior to weld joint fit up, and outlines the required non-destructive examination (NDE) testing and the required in-process inspections per contract requirements. The weld data log provides material traceability used to construct the weld and operates in conjunction with, and references, weld maps. The weld data log also insures that proper acceptance criteria are applied and thus serves to eliminate or at least reduce the occurrence of costly re-inspections.

The weld data log may also be utilized to document actions other than welding. Some non-limiting examples may include bolt torque requirements, installation processes and the application of high performance coatings. The weld data log may also be used to establish one or more hold points that require the user to complete a first task before being allowed to complete subsequent tasks.

Inspection and repair reports are created via links from the central location provided by the weld data log. Captured data is used to populate a weld reject log, weekly welding report, data packet and daily production reports. The weld data logs also eliminate a need for the manual creation of reports, thus reducing reporting errors.

FIGS. 5 and 6 show portions of the weld data log. Note that the base metals are specified, as is a list of tasks associated with the particular weld, where the tasks also include non-destructive examination testing-related tasks (e.g., visual inspections, ultrasonic inspections, magnetic particle inspections, radiographic inspections). Note that in the example shown in FIG. 5 the repair history indicates that no repairs to this particular weld were made, while the example shown in FIG. 6 provides the details of the repair history and the inspections that resulted in the repairs being made.

Each of the various types of NDEs (e.g., visual inspections, ultrasonic inspections, magnetic particle inspections, radiographic inspections) has an associated report that is filled in by the qualified inspector, such as via the mobile terminal 22, and recorded in the database 12 and associated with the appropriate weld data log.

Thus, the weld data log provides a history of all repairs (if any) associated with each weld, and provides positive proof that all required inspections and repairs have been completed, and supports and captures revisions to repair reports, such as critical weld repairs. The weld data log supports the creation of the (weekly) welding report (see FIG. 7), and may be utilized during a review of the (weekly) welding report.

As was noted above, the weld data log is designed to be utilized as a centralized location for the reporting of all contract required tasks, inspections and repairs related to individual welds. The weld data log is pre-loaded with contract-required tasks prior to welding. Those tasks that require the creation of reports preferably are provided with hyperlinks that direct the user to the applicable report. The status of all tasks is shown on the weld data log, including report number, the person who completed the task, the status and the date. Failed inspections are indicated in the repair section (repair history) of the weld data log. All failed inspections automatically create a "create repair report" hyperlink. The user is then given the option of creating a critical weld repair report (CWR) or a weld repair report (WRR). Once a repair report has been created the rejected inspection and the repair report are shown in the repair history section of the weld data log.

The weld quality assurance system 10 may also be utilized as a centralized repository for completed projects. The benefits of this include having a backup of the traditional hard copy, instant access to records and management of data that comes with the use of the overall weld quality assurance system.

Figure 10:
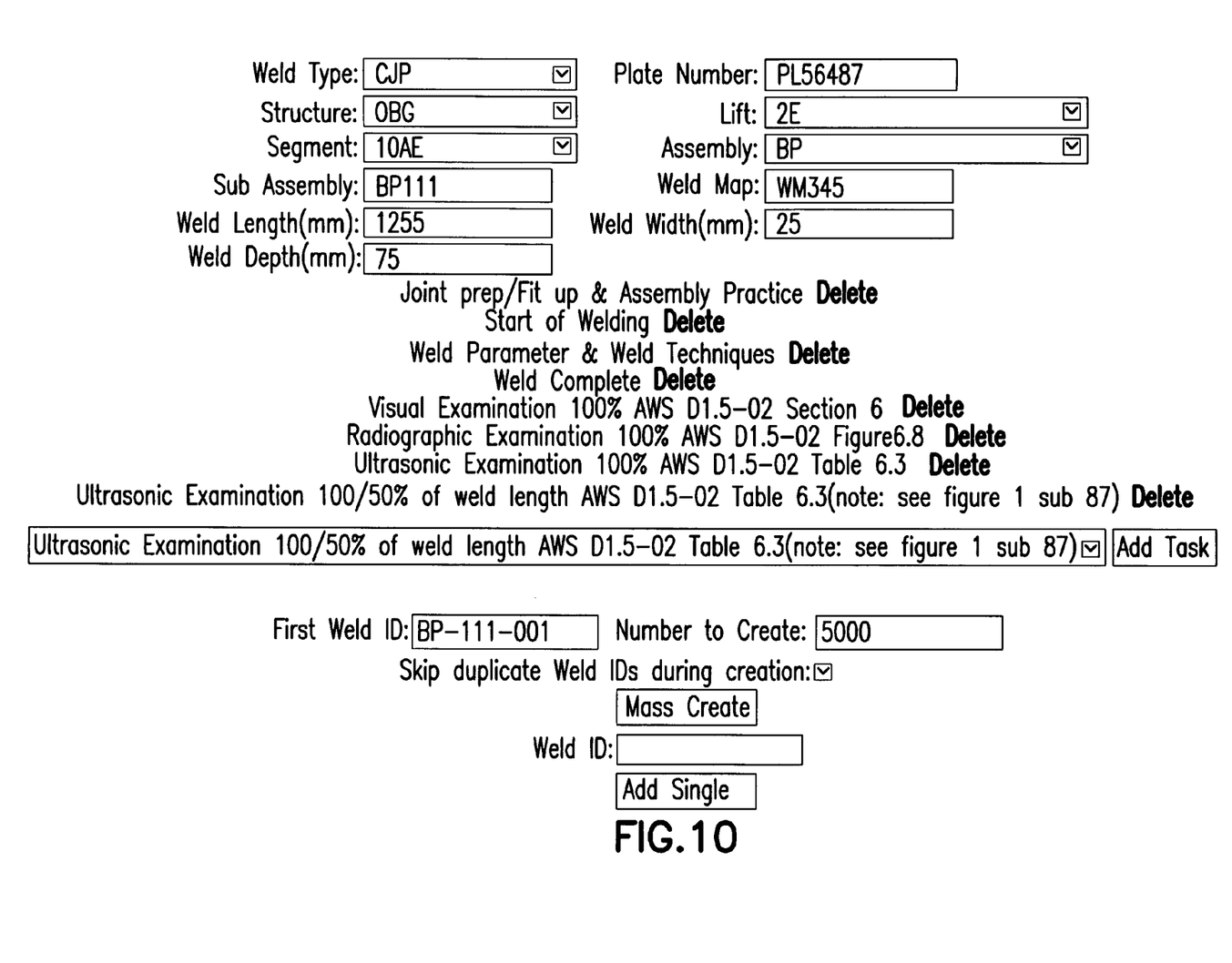
FIG. 10 shows an example of a mass weld data log creation which is another feature of the weld quality assurance system shown in FIG. 1.

It should be noted that weld data logs can also be created on a mass creation scale rather than individually as stated above. FIG. 10 illustrates this process.

It is noted that the repair reports have the ability to upload digital images, drawings and sketches to the database 12/DBM 12A.

Figure 8:
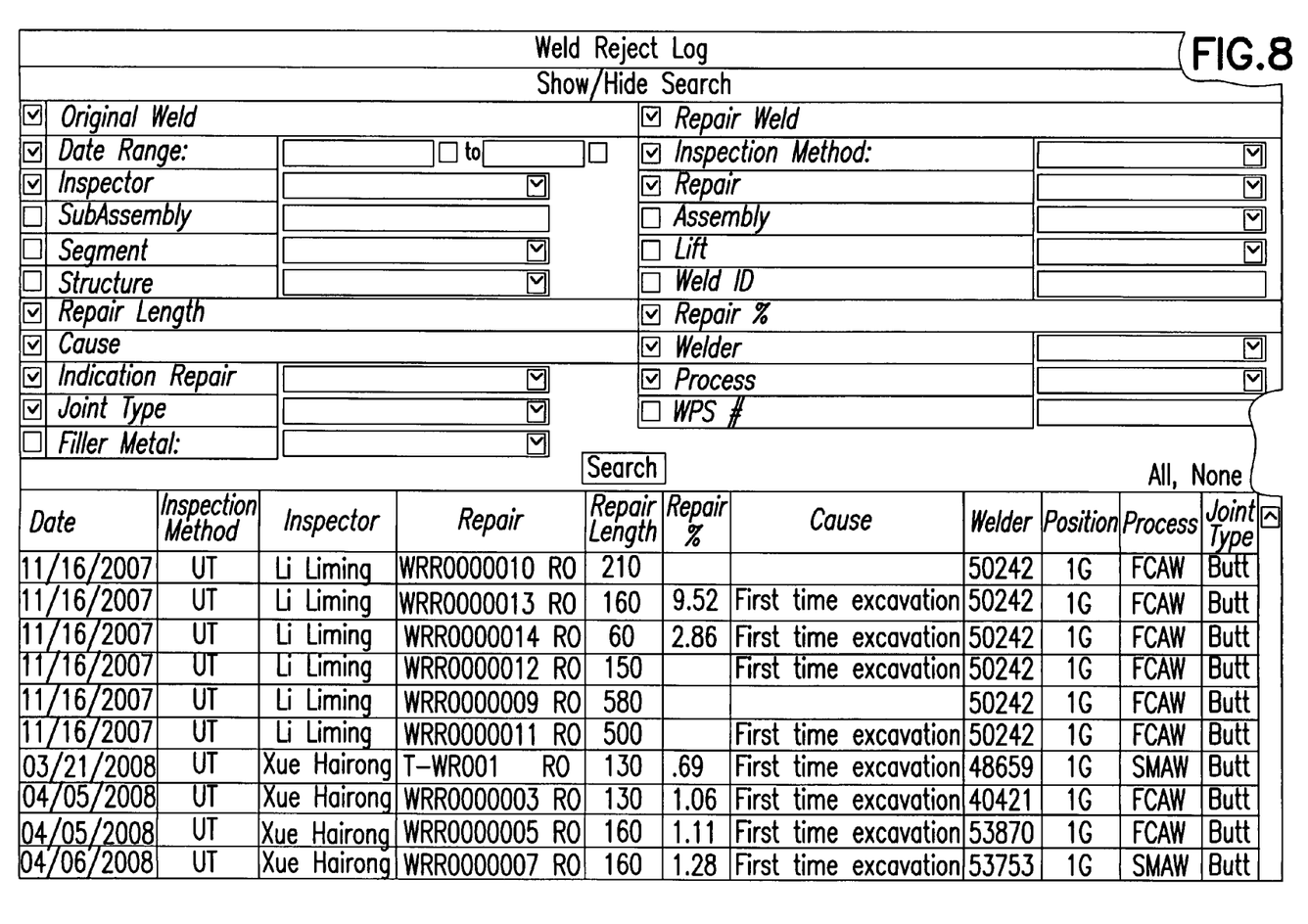
FIG. 8 shows an example of a weld reject log which is another feature of the weld quality assurance system shown in FIG. 1.

Another feature of the weld quality assurance system 10 is an ability to provide a centralized repository of welder performance data. Individual welder performance is captured on a weld reject log (see FIG. 8). Database filtering allows the user to search by any desired combination of fields of the weld reject log (e.g., repair identifier, repair length, welder, job type, etc.) The weld reject log may be utilized for trend analysis of weld repairs, as well to provide real time total reject percentages project wide by any filterable field.

The weld reject log may include some or all of the following information: inspector, welder, repair type, weld identification, location in the structure, position, process, joint type, repair length, repair depth, repair width, repair percent and cause for the rejection.

Another feature of the weld quality assurance system 10 is an ability to provide welder qualification records. Upon completion of the welder qualification test as required by the applicable code and contract a welder qualification record is completed. This record is used to document the welder's ability to produce sound welds. Upon completion of this record the welder qualification status throughout the weld quality assurance system 10 is automatically updated. The records populate the welder qualification log and may be printed if required.

Another feature of the weld quality assurance system 10 is the ability to document and provide the welding procedure specification and procedure qualification record. Both items are utilized during the weld qualification testing to document items such as the weld metal, weld wire, shielding gas, electrical parameters and position of testing. The records populate the welder qualification log and may be printed if required.

Figure 7:
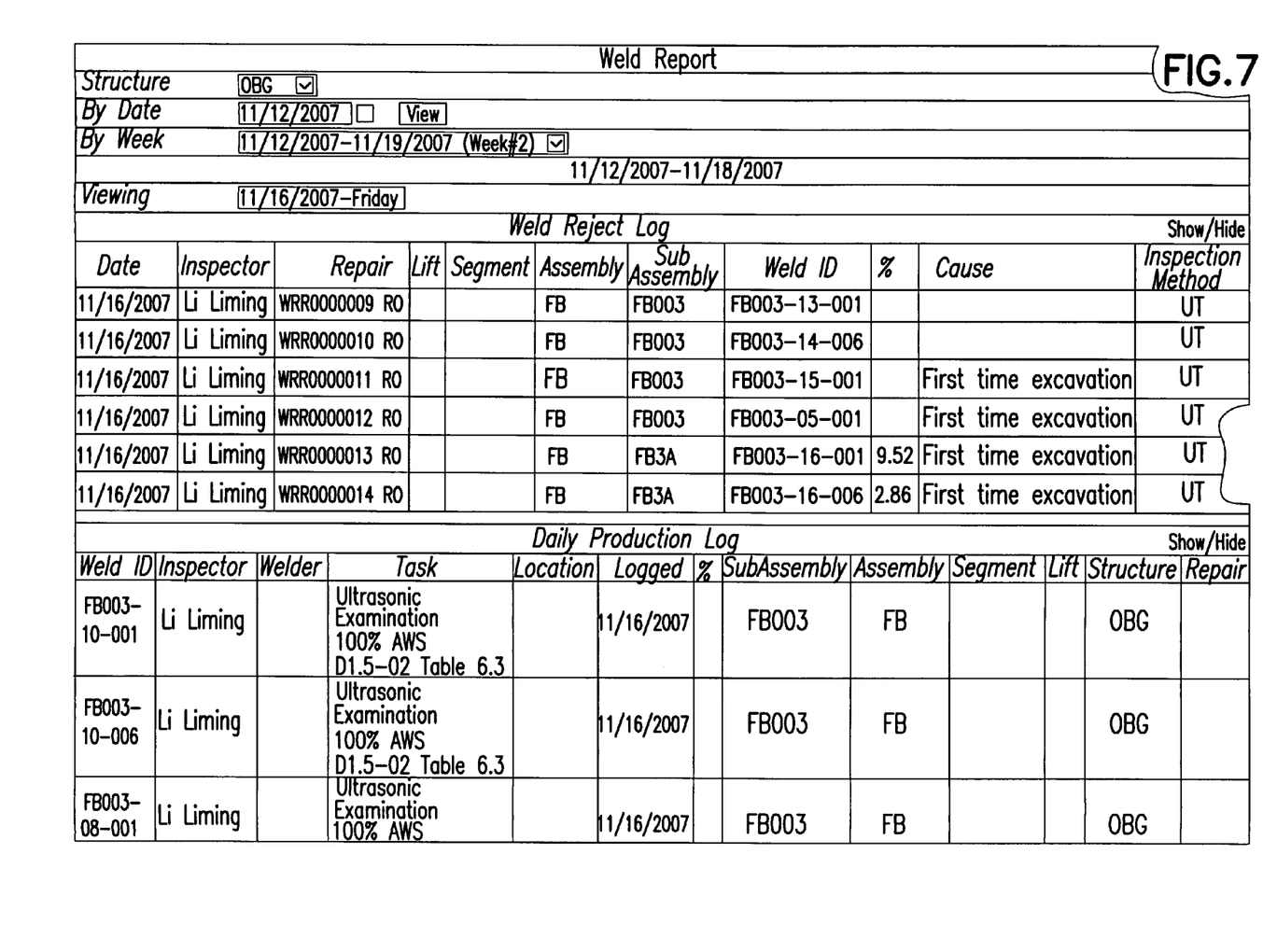
FIG. 7 shows an example of a (weekly) weld report which is another feature of the weld quality assurance system shown in FIG. 1.

The weekly welding report of FIG. 7 is compiled electronically following completion of tasks outlined on the weld data log. One possible use for the weekly welding report is review by the quality control manager, and it may be submitted electronically to the engineer for approval. During review of the weekly welding report by the engineer the database 12 may be available to verify the current status of inspections and repairs.

The weekly welding report may include some or all of the following information: non-destructive examination testing reports, critical weld repair reports, weld repair reports, heat straightening reports, nonconformance reports, the weld reject log and a daily production report.

Figure 9:
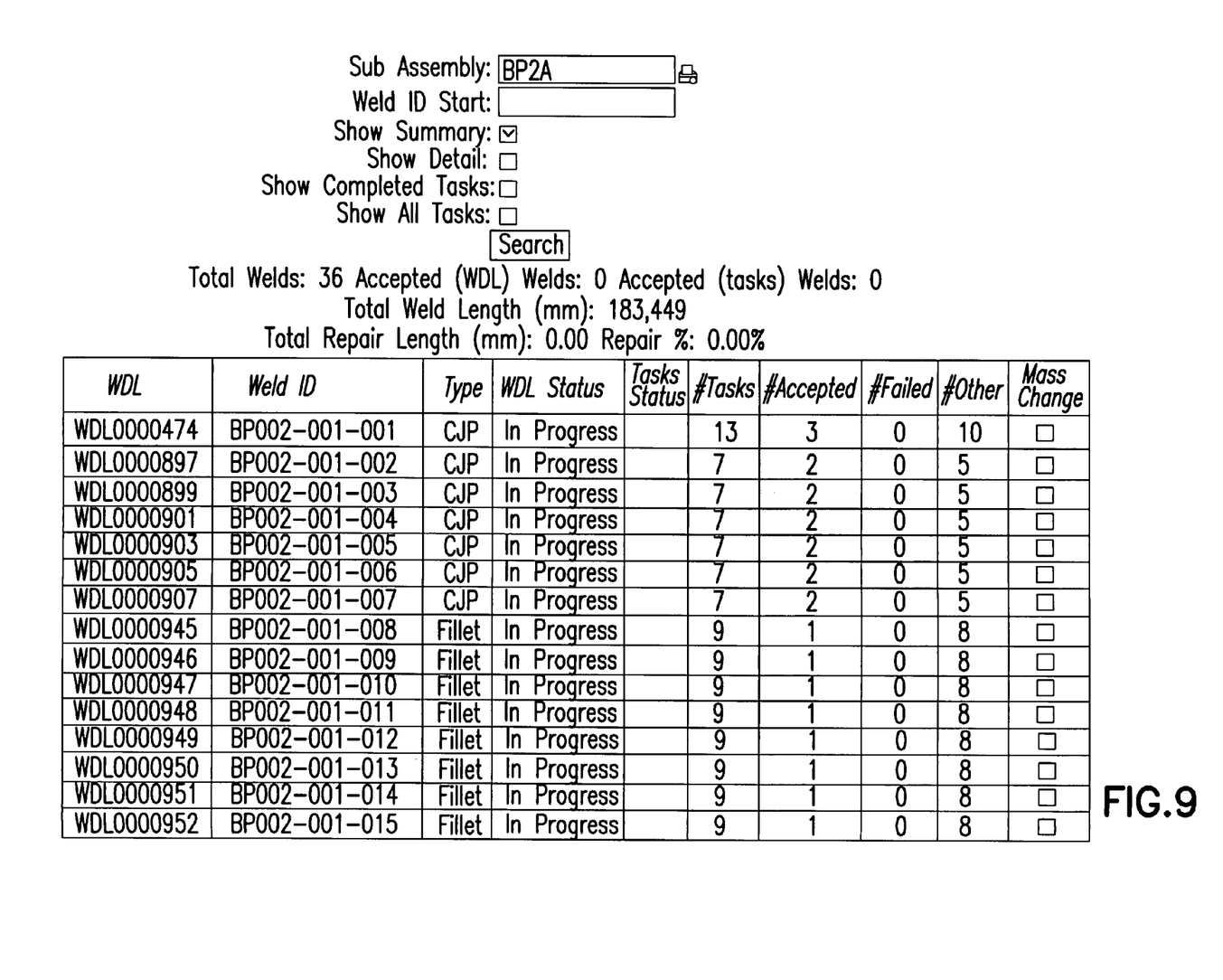
FIG. 9 shows an example of a data acceptance packet which is another feature of the weld quality assurance system shown in FIG. 1.

The various reports discussed above may be viewed electronically and/or printed. Final acceptance of components can be obtained by producing a data acceptance packet, such as the one shown in FIG. 9, which is compiled after completing a query to the database 12. The data acceptance packet may include some or all of the following information: non-destructive testing reports, weld repair reports, post-weld repair non-destructive examination reports, the weld map, the weld data log, material test report and in process inspections as required. Note that the exemplary data acceptance packet depicted in FIG. 9 pertains to a particular sub-assembly and shows the total number of welds, the total weld length, total repair length (zero in this case) and other pertinent information.

Based on the foregoing it can be appreciated that the use of the exemplary embodiments of this invention provide for the real time, paper-less (e.g., wireless) accurate and consistent reporting of inspection and repair results. Additionally, the electronic submission process reduces approval time and the number of required personnel. Additionally, there is provided an increased level of traceability of material. Additionally, the well documented inspections and repair results enable the customer to spend less time and have reduced involvement before, during and after fabrication of a particular project, including shipment. Additionally, the use of the exemplary embodiments of this invention eliminates the occurrence of costly re-inspections of previously inspected and accepted welds and components. In addition, the use of the exemplary embodiments of this invention enables information to be shared between all parties at all locations through the use of the web-based application. Further, the on-site reporting made possible by the use of the mobile terminals 22 increases work area coverage, and decreases the amount of office time needed. There is also provided an increased level of accountability of both welders and weld inspectors. Customer satisfaction is enhanced by providing access to the database 12 during the review and approval of the weekly welding report.

The use of the exemplary embodiments of this invention provides for the web-based application that facilitates cooperation between the fabricator, the contractor and the owner/customer, and captures valuable data that can be utilized to establish controls to reduce or eliminate defects, as well as to improve quality through the use of trend analysis.

It can be appreciated that the exemplary embodiments of this invention pertain to a system, such as the one shown in FIG. 1, to methods for using such a system, and to computer programs stored in computer-readable memory or memories for implementing the DBM 12A and the related server and other functionality. In this regard the DBM 12A can be considered to include at least one data processor (DP) 12B coupled with at least one memory (MEM) 12C that stores a computer program having instructions designed to implement the exemplary embodiments of this invention as described above. Note that the functionality of the DBM 12A could be incorporated in whole or in part in the web server 14.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, the use of the exemplary embodiments of this invention enables the recording and use of welding parameter documentation including, as non-limiting examples, welding parameters such as amps, volts, travel speed, wire speed, gas flow rate, material temperature and heat. Some or all of these parameters may be captured electronically and stored in the weld data log. The capture of the data may be done by interfacing with weld data logger technology. This information may also be manually entered into the database 12 either on the fix terminal computer 10 or on the mobile device 22.

Further by example, the use of the exemplary embodiments of this invention enables, in the case of high performance coatings, the monitoring and recording of environmental conditions using temperature/humidity data loggers. The documentation of blasting and coating operations may accomplished by using blasting and coating inspection records.

Further by example, the use of the exemplary embodiments of this invention enables the calibration of equipment to be monitored and documented. For example, calibration control may be accomplished through a master test and evaluation (MT&E) aspect, where application equipment, such as welding machines, pressure gauges, precise measuring devices, nondestructive testing equipment, load cells and other equipment may be bar coded for identification. The MT&E calibration log then automatically notifies the user prior to calibration due dates.

Further by example, the use of the exemplary embodiments of this invention facilitates heat treating and stress relieving operations, heat treating and stress relieving parameters, such as time and temperature, are documented, captured electronically and stored in the weld data log. The capturing of this data may be accomplished by interfacing with suitable technology.

Further by example, the use of the exemplary embodiments of this invention enables control of a welder's continuity log. Welding activities are required to be documented on the welder continuity log in order for the welder's certifications to remain active. Welders that are added to other parts of the application are automatically added to the welder continuity log.

Further by example, the use of the exemplary embodiments of this invention enables rotational capacity testing (Rocap) to be facilitated, where during rotational capacity testing of high strength nuts, bolts and washers a Rocap test report is completed. Items that have been procured and documented on the material data log can be used to populate the Rocap test report. Material test reports may also be used for fasteners, such as bolts, nuts and washers.

Further by example, the use of the exemplary embodiments of this invention facilitates the procurement and control of material. For example, purchase orders (PO) are generated for material procured for a project within the application. Following PO creation the PO and items are added to the material data log and are be logged as items are received.

Further by example, the use of the exemplary embodiments of this invention facilitates consumables tracking, where welding consumables are tracked by bar code technology. Consumables may be tracked by welder, location, weld joint number and time. This information may then be documented on a consumable tracking log, which may be utilized to ensure compliance with code and contract requirements.

Further by example, the use of the exemplary embodiments of this invention enables the use of the global positioning system (GPS) for determining and tracking the location of parts. For example, welds that require a more exact location in the final structure, such as buildings and pipelines, may utilize GPS measurements that include latitude/longitude, as well as the elevation of welds. The GPS information may be acquired electronically and wirelessly, and associated with those particular welds that need the additional location/elevation documentation. A GPS receiver may be associated with a particular piece of welding equipment and/or with one or more of the mobile data entry devices 22.

Further by example, the use of the exemplary embodiments of this invention facilitates dimensional control, where precise measurements are documented on the weld data log and captured by interfacing with dimensional mapping and measuring software.

As was noted above, the weld data log may be used for tasks other than welding. For example, the weld data log may be considered as a traveler that may be utilized to establish hold points that require action before a user can proceed to a next task. A non-limiting example of this concept is shown below for a process flow comprised of six discrete itemized tasks.

| Item No | Hold Point | Task |
| --- | --- | --- |
| 1 | X | Layout 25 mm hole per drawing PP-00223 |
| 2 | X | QA verification of 25 mm hole layout per drawing PP-00223 |
| 3 | X | Drill 25 mm hole |
| 4 | X | Tap 25 mm hole using tapper tap |
| 5 | X | Coat 25 mm machine screw with adhesive |
| 6 | | Install 25 mm machine screw with electric screw gun to a max torque of 12 ft/lbs |

Thus, while the exemplary embodiments of this invention have been described above in the context of certain specific types of log and reports, and while the drawing figures show certain types of specific data fields contained in logs and reports, these are all intended to be examples, and are not intended to be construed as being limiting with respect to the how this invention may be implemented and used.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method to provide quality assurance information for a construction project, comprising:
   populating a quality assurance database with identifications of individual ones of a plurality of construction project welders and weld inspectors; and
   further populating the quality assurance data base with a plurality of weld data logs individual ones of which are associated with a specific welding operation of the construction project, each weld data log being configured to store information that is at least descriptive of a welder, material used during the specific welding operation, specifics of a completed weld including at least weld location, weld type and weld dimensions, and information descriptive of a weld examination, where
   information entry into at least one weld data log is made by a weld inspector using a mobile terminal that is capable of wireless communication with the quality assurance database.

2. The method of claim 1, where each weld data log is further configured to store information descriptive of a time that the welding operation was started and a time that the welding operation was completed.

3. The method of claim 1, where each weld data log is further configured to store information descriptive of a weld repair, if any.

4. The method of claim 1, where the information descriptive of a weld examination comprises information derived from at least one type of non-destructive examination.

5. The method of claim 4, where the type of non-destructive examination is comprised of one of visual examination, ultrasonic examination, magnetic particle examination and radiographic examination.

6. The method of claim 1, further comprising periodically generating at least one type of report based at least on the plurality of weld data logs.

7. The method of claim 1, where the individual ones of the specific welding operations are uniquely identified using a bar code.

8. The method of claim 1, where the wireless communication comprises use of internet protocol (IP).

9. The method of claim 1, performed as a result of the execution of computer program instructions stored in at least one computer-readable memory.

10. A quality assurance system, comprising:
    an internet/wide area network interface configured to provide bidirectional communication with user terminals;
    a wireless interface configured to provide bidirectional communication with mobile user terminals; and
    a quality assurance database cooperatively coupled with a database manager configured to populate the quality assurance database with identifications of individual ones of a plurality of construction project welders, weld inspectors and a plurality of weld data logs individual ones of which are associated with a specific welding operation of a construction project, each weld data log being configured to store information that is at least descriptive of a welder, material used during the specific welding operation, specifics of a completed weld including at least weld location, weld type and weld dimensions, and information descriptive of a weld examination, where information entry into at least one weld data log is made by a weld inspector using a report from one of the mobile user terminals.

11. The quality assurance system of claim 10, where each weld data log is further configured to store information descriptive of a time that the welding operation was started and a time that the welding operation was completed.

12. The quality assurance system of claim 10, where each weld data log is further configured to store information descriptive of a weld repair, if any.

13. The quality assurance system of claim 10, where the information descriptive of a weld examination comprises information derived from at least one type of non-destructive examination.

14. The quality assurance system of claim 13, where the type of non-destructive examination is comprised of one of visual examination, ultrasonic examination, magnetic particle examination and radiographic examination.

15. The quality assurance system of claim 10, where said data base manager is further configured to periodically generate at least one type of report based at least on the plurality of weld data logs.

16. The quality assurance system of claim 10, further comprising an interface for receiving bar codes, where individual ones of the specific welding operations are uniquely identified using a bar code.

17. The quality assurance system of claim 10, where said data base manager is configured for operation as a result of the execution of computer program instructions stored in at least one computer-readable memory.

18. The quality assurance system of claim 10, where said internet/wide area network interface is comprised of a web server configured for operation with web browsers implemented in said user terminals.

19. A computer-readable memory that stores a program of computer-executable instructions, where execution of the instructions results in operations that comprise:
    populating a quality assurance database with identifications of individual ones of a plurality of construction project welders and weld inspectors;
    further populating the quality assurance data base with a plurality of weld data logs individual ones of which are associated with a specific welding operation of the construction project, each weld data log being configured to store information that is at least descriptive of a welder, material used during the specific welding operation, specifics of a completed weld including at least a unique weld identifier, weld location, weld type and weld dimensions, and information descriptive of a weld examination; and
    periodically generating at least one type of report based at least on the plurality of weld data logs, where information entry into at least one weld data log is made by a weld inspector using a mobile terminal that is capable of wireless communication with the quality assurance database.

20. The memory of claim 19, where each weld data log is further configured to store information that comprises at least one of:
    information descriptive of a time that the welding operation was started and a time that the welding operation was completed; and
    information descriptive of a weld repair, if any.

21. The memory of claim 19, where the information descriptive of a weld examination comprises information derived from at least one type of non-destructive examination.

22. The memory of claim 21, where the type of non-destructive examination is comprised of one of visual examination, ultrasonic examination, magnetic particle examination and radiographic examination.

23. The memory of claim 19, where the wireless communication comprises use of internet protocol (IP).

24. The memory of claim 19, further comprising an operation of querying the database to generate an acceptance packet for a particular component, the acceptance packet comprising information related to individual ones of the welds made for the particular component.

25. The memory of claim 19, where a weld data log establishes at least one hold point in a process flow.

* * * * *